Feb. 9, 1960  A. G. F. WALLGREN  2,924,491
MACHINES COMPRISING TWO ELEMENTS DISPLACEABLE
RELATIVE TO ONE ANOTHER
Filed Nov. 3, 1954  3 Sheets-Sheet 1

INVENTOR
AUGUST GUNNAR FERDINAND WALLGREN

BY *Jarvis C. Marball*
ATTORNEY

INVENTOR
AUGUST GUNNAR FERDINAND WALLGREN
BY Jarvis C. Marble
ATTORNEY

Feb. 9, 1960 A. G. F. WALLGREN 2,924,491
MACHINES COMPRISING TWO ELEMENTS DISPLACEABLE
RELATIVE TO ONE ANOTHER
Filed Nov. 3, 1954 3 Sheets-Sheet 3

INVENTOR

AUGUST GUNNAR FERDINAND WALLGREN

BY *Jarvis C. Marselle*

ATTORNEY

United States Patent Office 2,924,491
Patented Feb. 9, 1960

2,924,491

MACHINES COMPRISING TWO ELEMENTS DISPLACEABLE RELATIVE TO ONE ANOTHER

August Gunnar Ferdinand Wallgren, Goteborg, Sweden

Application November 3, 1954, Serial No. 466,639

Claims priority, application Sweden November 3, 1953

3 Claims. (Cl. 308—5)

My invention relates to machines, apparatus and in particualr machine tools having two elements displaceable relatively to one another, such as a bed and a slidable carriage or table located thereon and carrying tool holders, work-pieces etc.

To perform exact working operations with machines of the type in consideration, high precision is required with respect to the guide members disposed between said two elements. These guide members are conveniently formed as guideways, the table and the bed being provided with exactly worked faces sliding along one another. Due to the high static friction between the guide surfaces, large power is required to move the table. In particular, if the load is great and the travel of the table is to be extremely small, for example in the order of magnitude of one thousandth of a millimetre, the large adjusting power causes elastic deformations of the operating members which render it difficult to attain the required degree of precision. The friction, further, causes a wear which gradually lowers the precision with which the machine is capable of operating.

One object of my invention is to eliminate said deficiencies. According to one feature of my invention, the machine is formed so as to comprise shafts having centre lines which are parallel with the direction of travel of the displaceable element and which are mounted in radial bearing races, each race embracing substantially one half of the shaft and being disposed on the elements, said shafts being adapted to be rotated by means of driving members so as to cause the load to be transferred between said elements by means of lubricant films created between said shafts and said radial bearing races. As a result of these lubricant films, the power required for displacement of the table relative to the bed, for example, only amounts to a small fraction of the power required for a corresponding displacement on travel bars. A further object of my invention is to provide a machine having the elements displaceable relative to one another, with surfaces preferably disposed on the bearing races and formed so in relation to one another and the shafts, that they are in contact with one another when the shafts do not rotate, said shafts thus being relieved from the load and the elements upon starting of the rotational movement of said shafts are spaced from one another by the lubricant films created by said movement, the shafts thus being caused to take over the transfer of the load. Since the shafts at starting, when they bear against the bearing races with metallic contact, are relieved from load, the wear that otherwise is produced at starting by the friction of metal against metal is avoided, and the table is capable of assuming an exact position relative to the bed even after long use of the machine without re-adjustment. Further, the driving mechanism can be dimensioned for a correspondingly smaller power, since it does not have to overcome the starting friction of loaded shafts.

It may happen that the force acting on the table is directed upwardly in relation to the bed, the table thus requiring capacity of absorbing such force also. A further object of my invention is to provide a machine of the kind in consideration in which, according to a further feature of my invention, forces of said kind are transferred from the table to the bed through connecting members movable together with a table and a shaft mounted rotatably in the bed so as to effect this kind of power transfer also through lubricant films.

Further objects and advantages of my invention will be apparent from the following description considered in connection with the accompanying drawings which form part of this specification and of which:

Figs. 6A-C and Figs. 7A-C illustrate the relation of the rotating shafts to the bearing races constructed, according to two embodiments of the invention.

Figure 1:
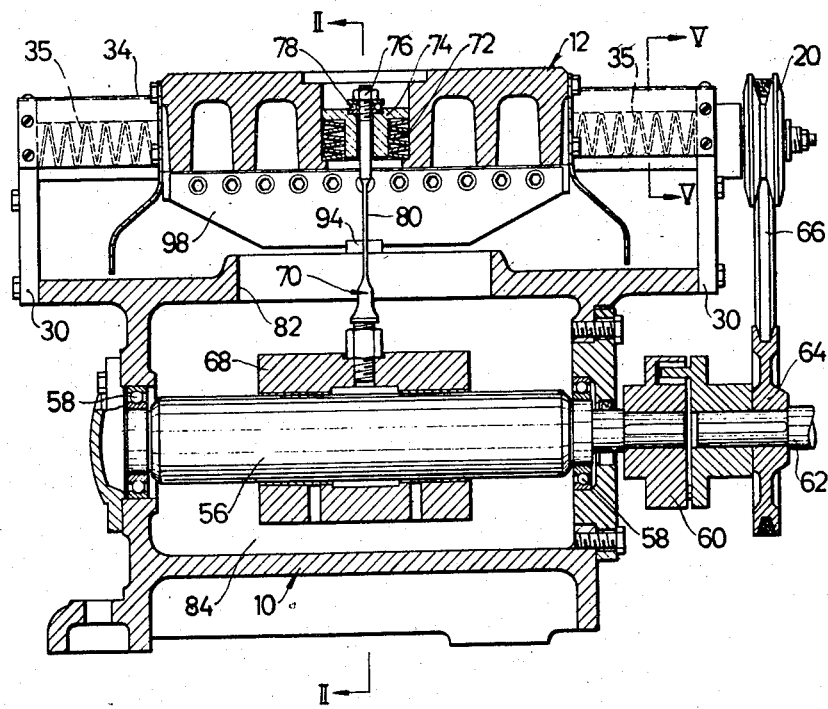
Fig. 1 is a vertical longitudinal section through an experimental apparatus constructed according to my invention; said figure being a section taken on line I—I of Fig. 2 which in turn is a cross-section taken on line II—II of Fig. 1.
Figure 4:
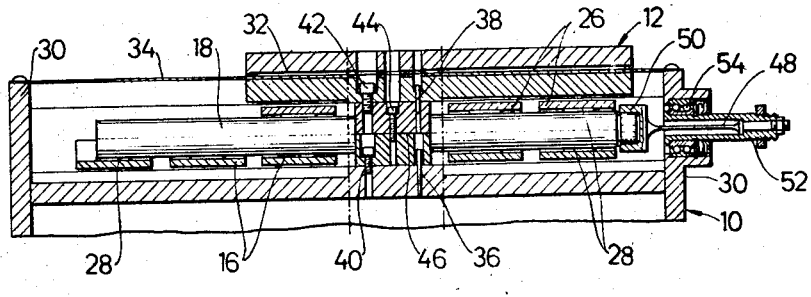
Fig. 4 is a vertical longitudinal section with its major part following line IV—IV of Figs. 2 and 3, the central portion being cut following line VI—VI of Fig. 3.
Figure 2:
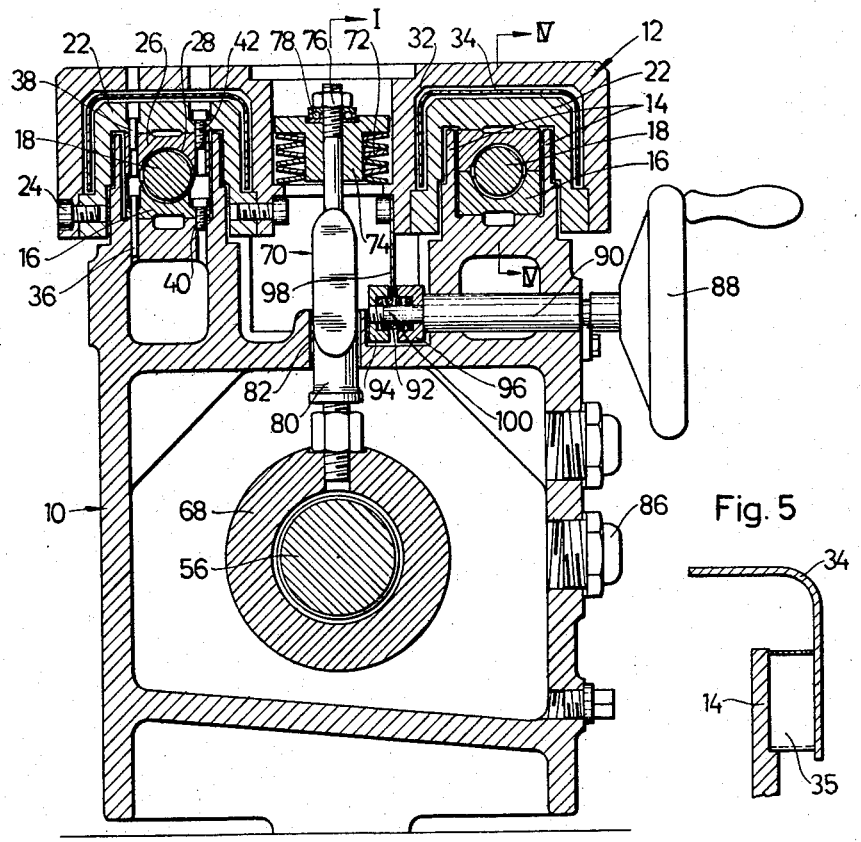
Figure 5:
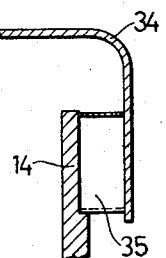
Fig. 5 is a sectional view on line V—V of Fig. 1.
Figure 3:
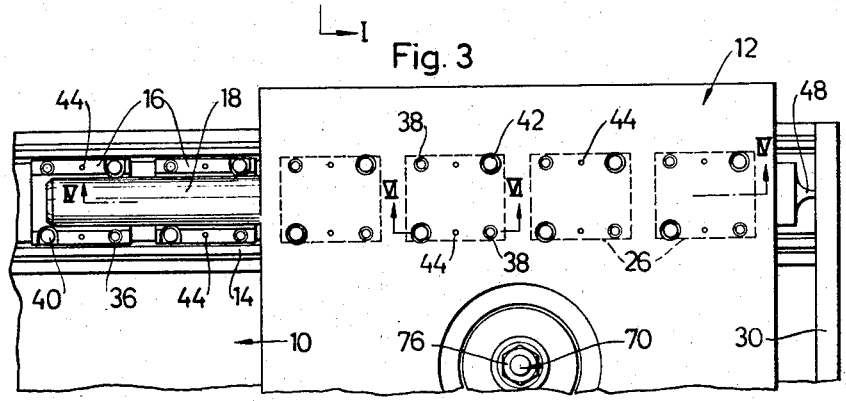
Fig. 3 is a top view of part of the apparatus.

Referring to the drawings, 10 generally designates the bed or immovable support of the apparatus, 12 designating a table or slide horizontally displaceable on said bed. The top surface of the bed is formed with upwardly projecting walls 14 constituting laterally limiting walls for two open-topped containers. Inserted into said containers are radial bearing races 16 resting on the bottom of the containers and axially spaced from one another by a small distance, as is illustrated in Fig. 4, for example. The bearing races carry two shafts 18 each of which is driven by its individual driving wheel, such as pulley 20. The table 12 which is shorter than the bed 10 is provided with two members 22 formed as an inverted U rigidly secured to the table by means of bolts 24. These members which are drawn over the walls 14 carry radial bearing races 26. The bearing races 16 and 26 embrace each about half of the circumference of the shafts 18 and they may have a lining 28 of a suitable bearing metal. The longitudinally extending container formed by the walls 14 is partly filled with lubricant or oil which is prevented by covers 30 from escaping at the ends of the containers. Between the table 12 and the members 22 is a clearance 32 containing a plate 34 shaped as an inverted U extending over the entire table and rigidly secured to the covers 30. Said plate 34 has for its object to prevent foreign particles from penetrating to the sliding surfaces of the bearings. Downwardly open clearances on both sides of the table 12 between the plate 34 and the container 14 may be sealed by means of flexible bellows 35 which are fixed to the table and the covers 30 and the length of which thus is adjusted automatically to correspond to the position of the table on the bed.

Figure 6A:
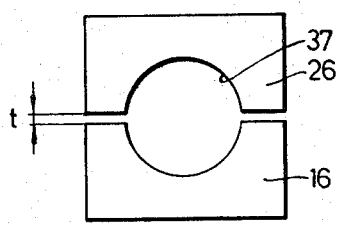
Figure 6B:
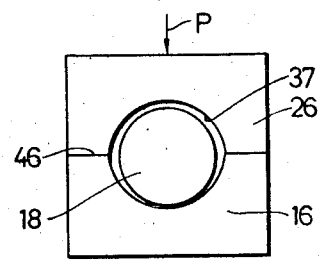
Figure 6C:
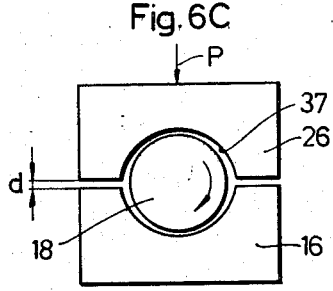

In the embodiment presented in Figs. 6A to 6C the bearing races 16 and 26 are formed with cylindrical bearing surfaces 37 which in Fig. 6, are presented to be on the same circular line when the races are spaced from one another by a clearance or play $t$. Fig. 6B shows a shaft 18 having a smaller diameter than that of the bearing surfaces 37 interposed between said surfaces. The bearing races abut against one another at the surfaces 46, a play nevertheless existing between the shaft and the bearing surfaces. If the number of revolutions is 0 and the race 26 is subjected to a load P emanating from the table, the shaft 18 will be unloaded. In Fig. 6C the shaft is supposed to be rotated, said movement creating between said shaft and the bearing surfaces 37 a lubricant film resulting in a spacing of the bearing surfaces from one another for a distance corresponding to the clearance $d$. The transfer of the load P from the one bearing race to the other is now effected through the shaft 18. The clearance or play $t$ corresponds to the thickness of the lubricant film, in the almost theoretical case, the load $P=0$ and the oil film thus has the same thickness around the circumference. It will be easily understood that $t$ is larger than $d$ which in turn is larger than 0.

Figure 7A:
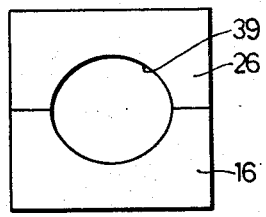
Figure 7B:
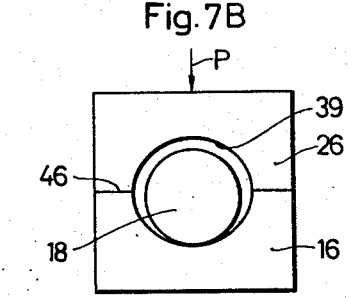
Figure 7C:
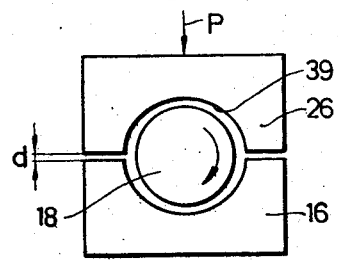

The Figs. 7A to 7C present another embodiment of the invention according to which the form of the bearing surfaces 39 differs from that of the shaft 18 by being oval-shaped. In Fig. 7A the bearing races 16 and 26 abut against one another which also is the case in Fig. 7B where the shaft 18 has a play relative the race 26 loaded by the force P. By rotation of the shaft 18 a lubricant film is produced which raises the race 26 so as to create the clearance $d$. In accordance with the invention, the shafts 18 are not loaded except during rotation.

The shape just described of the shafts and the bearing surfaces places great demands on the accuracy of the assembling of the parts constituting the apparatus or machine. For this reason said assembling is advantageously made by mounting all radial bearing races on auxiliary shafts, the mutual spacing of which is exactly fixed by means of head plates. These auxiliary shafts may then have a diameter identical with that of the annular surfaces 37 in the embodiment presented in the Figs. 6A to 6C. The upper and lower bearing races are connected with one another in pairs by means of screws 44 around the auxiliary shafts. Their bearing surfaces will all have correct position in relation to one another. The lower races 16 are rigidly secured onto the bed by means of screws 40 and the upper ones to the table by means of screws 42. Taper pins 36 and 38, respectively, are introduced in order to secure adjustably the races in their position relative to the bed and the table, respectively. Thereupon, the screws 44 are removed and the shafts 18 inserted between the bearing races.

When the shafts 18 are rotated, lubricant films are produced between said shafts and the sliding surfaces of the bearing races, said lubricant films having such thickness as to raise the upper races 26 from the lower ones 16 so as to form the clearance $d$. The contact hitherto established by the surfaces 46 is interrupted and the races become capable of being displaced relative to one another. The races 16 and 26 are disposed in relation to one another so as to ensure that surfaces 46, sufficiently large to carry the shaft, come into contact with one another in every position of the table on the bed when the rotation of the shafts 18 is stopped.

The shafts 18, the rotatory movement of which requires only small forces, may be connected to the pulleys 20 through small spindles 48, the end portion 50 of which may be shrunk on the end of that shaft to which it is connected. Each of the spindles 48 extends into its individual sleeve 52 to which the pulley 20 is rigidly secured and which is mounted in the bed on bearings 54. The spindles 48 are intended to enable an adjustment compensating for faults in the assembly and they thus serve as a kind of elastic coupling if the centre line of the sleeves 52 should not exactly coincide with that of the shafts 18.

In the interior of the bed 10 a shaft 56 is mounted in bearings 58. Said shaft is driven through a coupling 60 by a shaft 62 connected with a driving member (not shown). The shaft 62 carries a pulley 64, a V-belt 66 passing around said pulley and the two pulleys 20. The shafts 18 are thus driven from the shaft 62. A sleeve 68 is mounted on the shaft 56. Screwed into the latter is one end of the bar 70 extending upwardly into the table 12, which is provided with a recess housing in which a number of disc springs 72 are superimposed by a collar sleeve 74 through which the bar 70 extends. By driving home a nut 76 provided at the upper end of the bar, the springs 72 may be compressed to a predetermined desired degree. An axial thrust bearing 78 may be interposed between the nut 76 and the sleeve 74. The central portion 80 of the bar 70 may be formed as a strip or band to obtain greater ductility and in this known way to attain control of the tractive power with which the table 12 is pressed against the shaft 56 during trials with the experimental machine or apparatus. A longitudinally extending recess 82 is provided in the bed to allow the bar 70, undisturbed, to follow the table in the movements thereof.

The springs 72 are intended, in the experimental apparatus, to correspond to the actual load which in a machine tool or like apparatus acts on the table 12. In such latter case, said springs are abolished and the table is connected with the sleeve 68 through a bar adjustable in its longitudinal direction.

The space 84 surrounding the shaft 56 is filled with oil, the level of which may be inspected through a plug 86 of transparent material. The table 12 is locked in a predetermined position by means of a hand wheel 88 mounted on a shaft 90, the end portion 92 of which is secured to a shoulder 94 by means of a screw connection. Clamped between said shoulder and a stop 96 located on the shaft 90 is a plate 98 secured to the table 12. Said plate is rigid in its longitudinal direction but flexibly pliable in the transverse direction so as to prevent transversally acting forces from being created at the lower end of the plate on tightening of the shoulder 94. Interposed between shoulder 94 and the stop 96 is a spring 100 intended to push said members from one another.

The lubricant film produced by the rotation of the shafts 18 and 56, respectively, make possible that, in the experimental apparatus described, the table or slide 12 when under a load of the order of magnitude of 1000 kilograms can be displaced by means of a power smaller than 1 kilogram. Since the shafts 18 are unloaded when at rest, the shafts and the bearings are not exposed to any wear even during starting and stopping operations.

Though my invention is illustrated by and described in connection with an experimental apparatus, it will be easily understood that machines and, in particular, machine tools intended for actual use will have their substantial parts constructed in the same manner as realized in the experimental apparatus. The table carried by the shafts 18 may be carried by a carriage which in turn is displaceable relatively to a stationary bed. The shafts 18 may rotate in the same direction or opposite directions and their number may also be varied.

While one more or less specific embodiment of my invention has been described, it is to be understood that this is for purpose of illustration only and that my invention is not to be limited thereby, but its scope is to be determined by the appended claims.

What I claim is:

1. In a machine comprising an upper and a lower major component longitudinally movable relative to each other, the upper component being longitudinally shorter than the lower component, shafts having axes the center lines of which extend parallel with the direction of relative longitudinal movement between said components, each of said shafts being mounted in a series of aligned separate radial bearing members secured to said components, said members each providing a bearing surface embracing substantially one-half of the shaft with which it is associated, means forming a lubricant reservoir substantially enclosing each shaft and cooperating bearing member, and means for rotating said shafts to thereby create a film of lubricant between the rotating shafts and the bearing members to cause the load from one to the other of said components to be transferred from one to the other of said bearing members through the rotating shaft therebetween and the film of lubricant surrounding the rotating shaft.

2. A machine as defined in claim 1 comprising a shaft rotatably mounted within one of said components, a connecting member movable together with the other of said components, said connecting member being operatively connected with said shaft to prevent separation of said components.

3. A machine as defined in claim 1 in which one of said major components is formed with longitudinally extending grooves having the transverse section of an inverted U operative to form protective covers for the aforesaid shafts and bearing members supported by the other of said major components.

References Cited in the file of this patent
UNITED STATES PATENTS

| | | |
|---|---|---|
| 2,462,659 | Molotzak | Feb. 22, 1949 |
| 2,631,067 | Arms et al. | Mar. 10, 1953 |
| 2,693,396 | Gondek | Nov. 2, 1954 |